(12) United States Patent
Kohtani

(10) Patent No.: US 11,635,488 B2
(45) Date of Patent: Apr. 25, 2023

(54) SELF-DIAGNOSIS DEVICE

(71) Applicant: DENSO CORPORATION, Kariya (JP)

(72) Inventor: Masato Kohtani, Kariya (JP)

(73) Assignee: DENSO CORPORATION, Kariya (JP)

( * ) Notice: Subject to any disclaimer, the term of this patent is extended or adjusted under 35 U.S.C. 154(b) by 150 days.

(21) Appl. No.: 17/136,290

(22) Filed: Dec. 29, 2020

(65) Prior Publication Data

US 2021/0208243 A1  Jul. 8, 2021

(30) Foreign Application Priority Data

Jan. 8, 2020 (JP) .............................. JP2020-001389

(51) Int. Cl.
  *G01S 7/40* (2006.01)
  *G01S 7/35* (2006.01)
  *G01S 13/02* (2006.01)

(52) U.S. Cl.
  CPC .............. *G01S 7/40* (2013.01); *G01S 7/352* (2013.01); *G01S 7/358* (2021.05); *G01S 7/4021* (2013.01); *G01S 2013/0263* (2013.01)

(58) Field of Classification Search
  CPC ............ G01S 7/40; G01S 7/352; G01S 7/358; G01S 7/4021; G01S 2013/0263; G01S 13/0254
  See application file for complete search history.

(56) References Cited

U.S. PATENT DOCUMENTS

| | | | |
|---|---|---|---|
| 9,628,203 B2 * | 4/2017 | Weissman | .............. H04B 17/14 |
| 2013/0106398 A1 | 5/2013 | Sato | |
| 2015/0276919 A1 | 10/2015 | Matsumura | |

FOREIGN PATENT DOCUMENTS

| | | | | |
|---|---|---|---|---|
| JP | 2019-149684 A | | 9/2019 | |
| JP | 2019149684 A | * | 9/2019 | .......... H01M 10/345 |

OTHER PUBLICATIONS

"AWR1243 Single-Chip 77- and 79-GHz FMCW Transceiver" Texas Instruments Incorporated <http://www.ti.com/lit/ds/symlink/awr1243.pdf> (revised Apr. 2020).

* cited by examiner

*Primary Examiner* — Olumide Ajibade Akonai
*Assistant Examiner* — Oladimeji Oyegunle
(74) *Attorney, Agent, or Firm* — Posz Law Group, PLC

(57) ABSTRACT

A self-diagnosis device of a module including a general-purpose multi-channel IC and a reception phase shifter IC having a plurality of transmission output terminals and reception terminals is configured to perform a self-diagnosis of the reception phase shifter IC by utilizing a signal that is generatable by the general-purpose multi-channel IC, which is enabled by a self-diagnosis signal generation unit that generates a self-diagnosis signal by using (a) a first output signal supplied to a multi-channel receiver of the general-purpose multi-channel IC and (b) a third output signal and a self-diagnosis clock signal synchronously output from a single PLL.

15 Claims, 13 Drawing Sheets

SELF-DIAGNOSIS DEVICE

CROSS REFERENCE TO RELATED APPLICATION

The present application is based on and claims the benefit of priority of Japanese Patent Application No. 2020-001389, filed on Jan. 8, 2020, the disclosure of which is incorporated herein by reference.

TECHNICAL FIELD

The present invention generally relates to a self-diagnosis device.

BACKGROUND INFORMATION

In recent years, many technologies such as collision prevention and automatic drive operation have been proposed, among which a measurement technology using radar technology such as the distance measurement from the own device to the target, the relative speed measurement with the target, and the existence angle measurement of the target (arrival/incident angle of a radar received waves) are attracting attention. The applicant has proposed a millimeter-wave band radar system for a moving body as a device for measuring the distance from the own device to the target, the relative velocity to the target, and the existence angle of the target. The semiconductor integrated circuits that make up the millimeter-wave band radar system have, as a built-in function, a BIST (Built-in Self-Test) function that tests internally in order to realize self-diagnosis and reduce the cost required for testing at the time of shipment. The BIST function may be performed by a Built-in Self-Test circuit.

As a conventional self-diagnosis method, in a configuration in which a received signal received via loopback of a transmission channel is mixed with a local signal generated by an oscillator by using a frequency mixer to output a DC voltage, a phase control unit changes the phase of the local signal to detect the DC voltage, and calculates a gain of the receiver from the magnitude of the change in the DC voltage. However, in such method, since the frequencies of the received signal and the local signal of the frequency mixer are equal, only a simple DC gain inspection using the DC offset by so-called self-mixing can be performed.

BRIEF DESCRIPTION OF THE DRAWINGS

Objects, features, and advantages of the present disclosure will become more apparent from the following detailed description made with reference to the accompanying drawings, in which.

DETAILED DESCRIPTION

Figure 1:
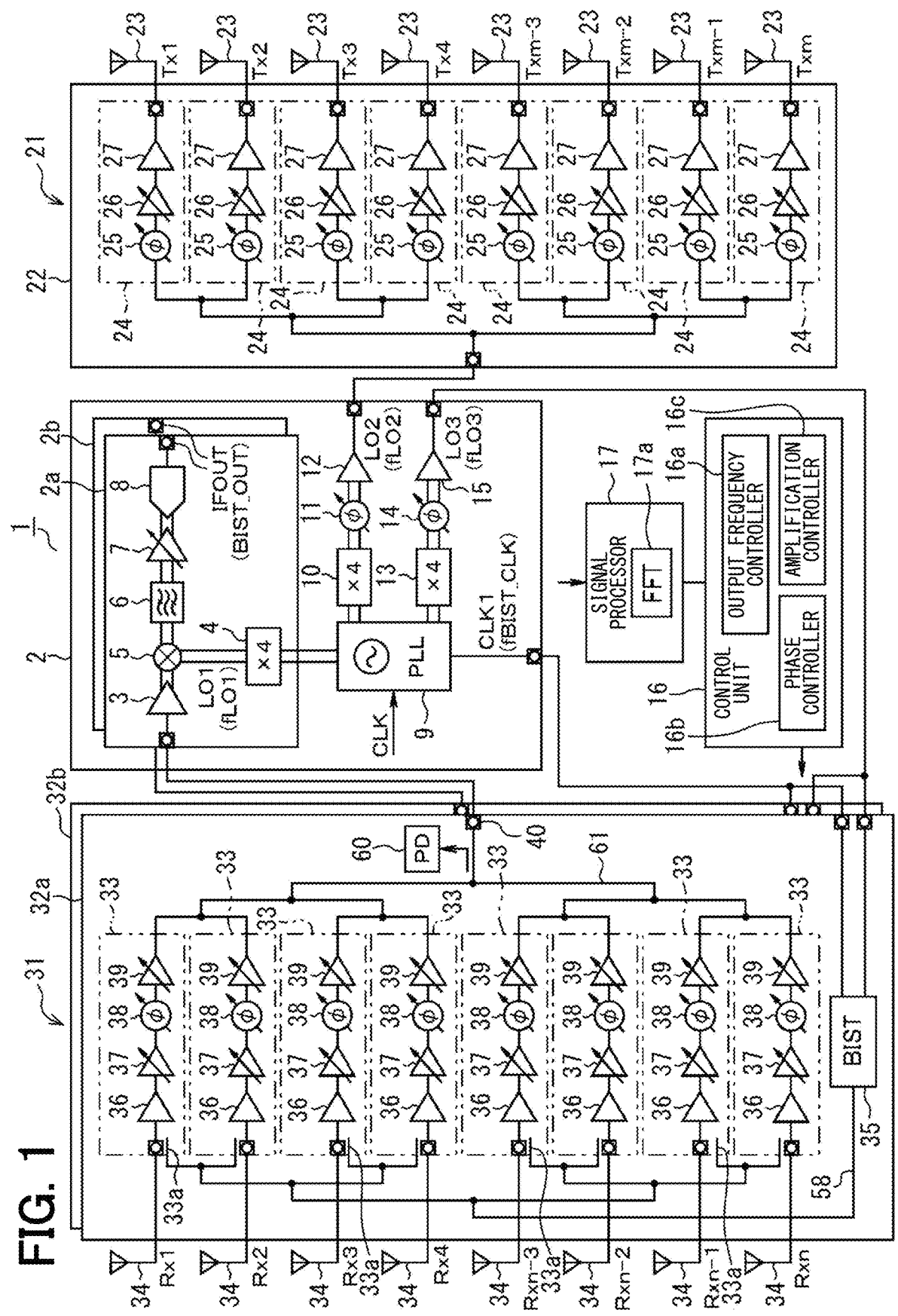
FIG. 1 is an electrical configuration diagram of a phased-array antenna module of a millimeter wave radar according to a first embodiment.

Hereinafter, some embodiments is described with reference to the drawings. In each of the embodiments described below, the same or similar reference numerals are used to designate the same or similar configurations, and a description thereof is omitted as necessary.

First Embodiment

Figure 2:
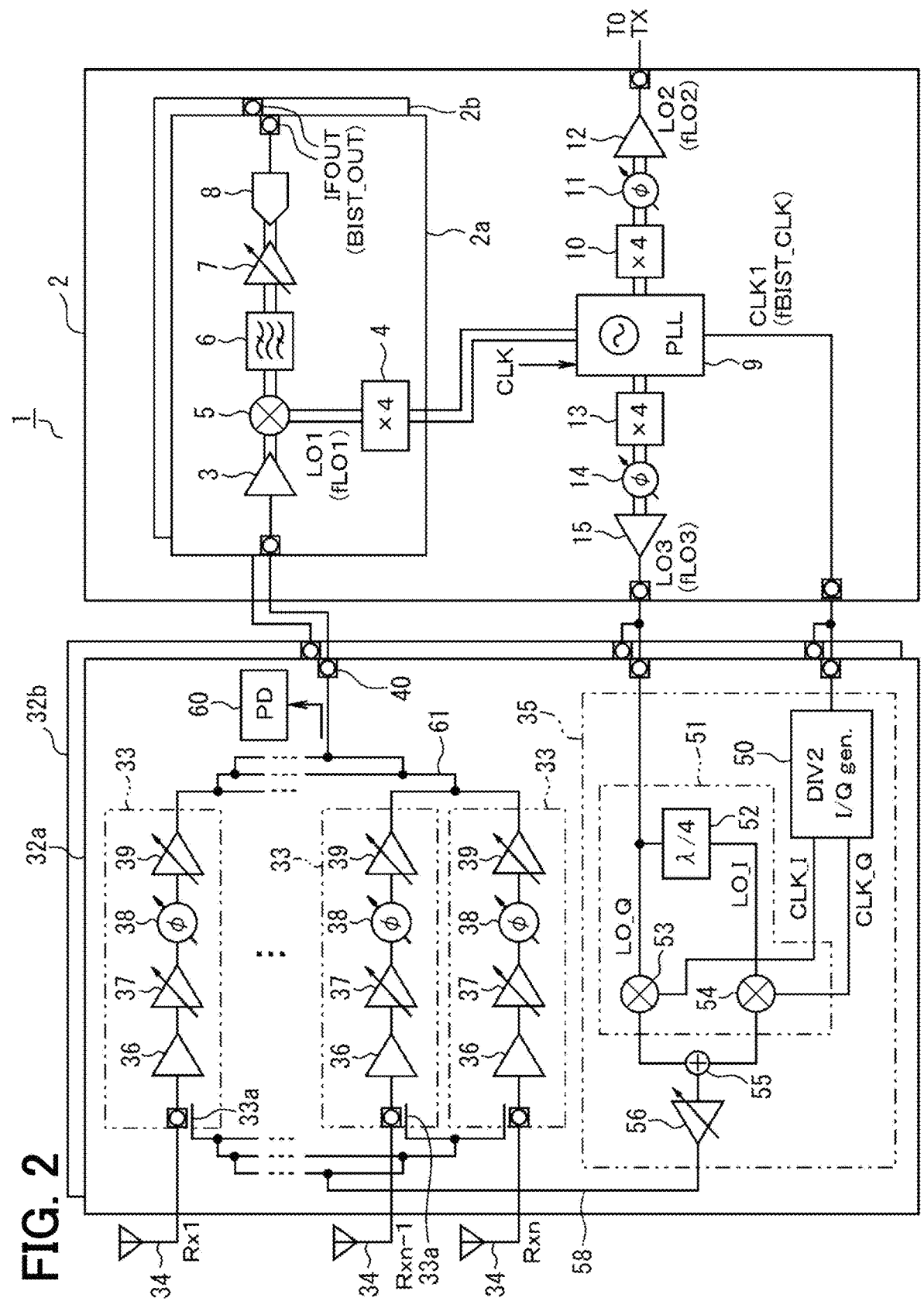
FIG. 2 is an electrical configuration diagram of a self-diagnosis signal generation unit according to the first embodiment.
Figure 3:
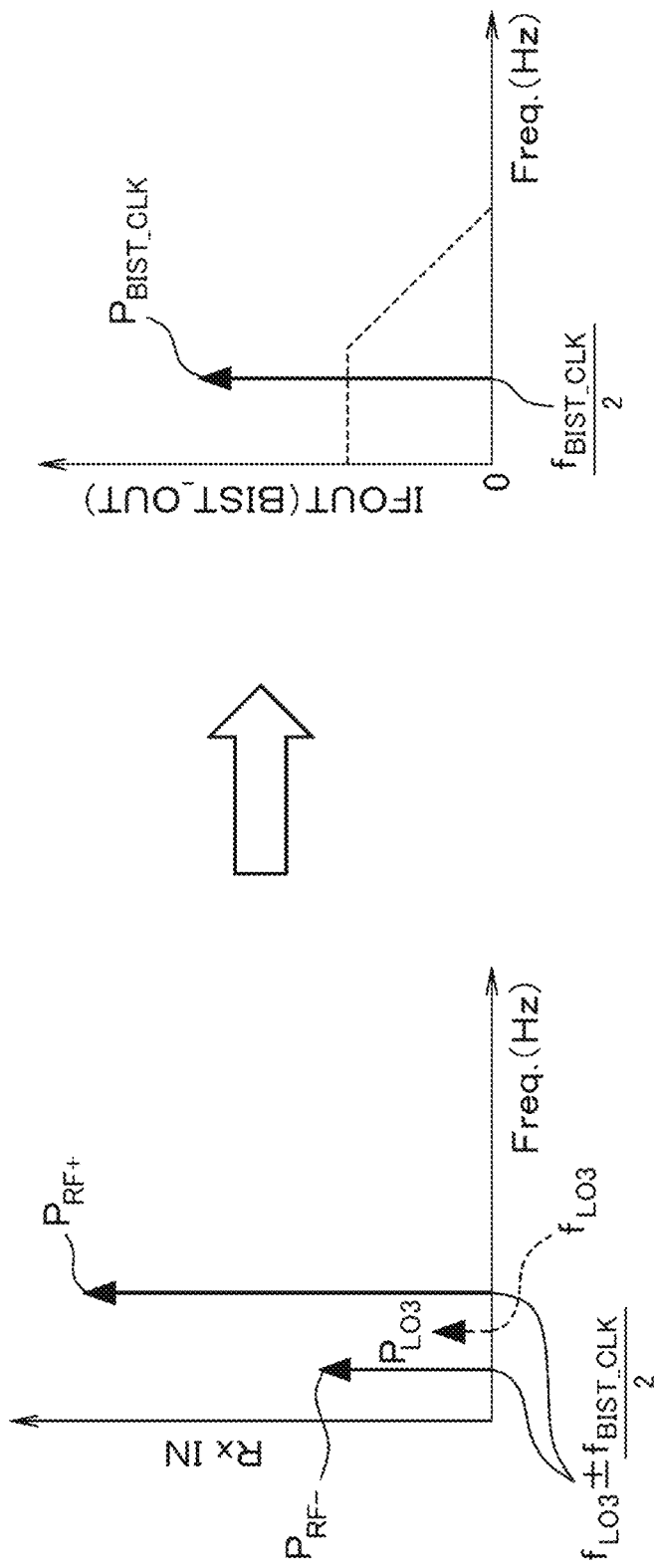
FIG. 3 is an explanatory diagram of a spectrum characteristic of a self-diagnosis signal according to the first embodiment.

FIG. 1 to FIG. 3 show explanatory views of the first embodiment. A phased array antenna module 1 for millimeter wave radar constituting a radar system illustrated in FIG. 1 is configured by connecting a general-purpose multi-channel IC 2, a transmission phased array unit 21, and a reception phased array unit 31, and a control unit 16 controls entire module 1 for its operation. Hereinafter, the phased array antenna module 1 for millimeter wave radar may be abbreviated as a module 1. The radar system using the module 1 processes the signals output from the general-purpose multi-channel IC 2 (also known as a multi-channel circuit) and the reception phased array unit 31 by using a signal processor 17.

The transmission phased array unit 21 includes a transmission phase shifter IC 22 and a transmission antenna 23 connected to each of transmission ends of transmission channels Tx1 to Txm of the transmission phase shifter IC 22. The reception phased array unit 31 includes two reception phase shifter ICs 32a and 32b, and a reception antenna 34 connected to each of reception ends of reception channels Rx1 to Rxn of the reception phase shifter ICs 32a and 32b.

The control unit 16 performs various control functions such as an output frequency controller 16a, a phase controller 16b, and an amplification controller 16c by executing a predetermined control logic. The output frequency controller 16a controls the output frequency of a PLL (Phase-Locked Loop circuit) 9. The phase controller 16b performs the phase control of phase shifters 11 and 14 of the general-purpose multi-channel IC 2, the phase control of a phase shifter 25 of the transmission phased array unit 21, and the phase control of a phase shifter 38 of the reception phased array unit 31. The amplification controller 16c controls the amplification degree of a variable gain amplifier 26 of the transmission phased array unit 21 and variable gain amplifiers 37 and 39 of the reception phased array unit 31.

The general-purpose multi-channel IC 2 operates by inputting processed signals from the reception phased array unit 31, and includes multi-channel receivers 2a and 2b (also known as the first multi-channel receiver 2a and the second multi-channel receiver 2b), the PLL 9, a multiplier 10, a phase shifter 11, a power amplifier 12, a multiplier 13, a phase shifter 14, and a power amplifier 15. The multi-channel receivers 2a and 2b are configured to respectively include an LNA (Low Noise Amplifier) 3, a multiplier 4, a mixer 5, an IF filter 6, and an intermediate frequency (IF) variable gain amplifier 7 (also known as an IFVGA 7), respectively. The details of configuration of the multi-channel receivers 2a and 2b are described later.

The general-purpose multi-channel IC 2 is an FMCW/FCM (Frequency Modulated Continuous Wave/Fast Chirp Modulation) transceiver IC used in the millimeter wave band (76 GHz-81 GHz) having transmission output for a plurality of channels and a plurality of channels of reception input. The general-purpose multi-channel IC 2 of the present embodiment is described with reference to a configuration example of transmission 2ch and reception 2ch. However, for example, a configuration of transmission 3ch and reception 4ch may also be used, and the number of transmission output channels and the number of reception input channels may be arbitrarily set.

The PLL 9 uses a reference clock CLK input from a reference oscillation circuit (not shown), and adjusts parameters such as a multiplication factor of the reference clock CLK to obtain, for example, for synchronous generation of a first signal to a third signal of the frequency in the GHz band, along with synchronous generation of a fourth signal in the MHz band. The PLL 9 outputs a first raw signal to the multi-channel receivers 2a and 2b. The multi-channel receivers 2a and 2b have a built-in multiplier 4, and multiply the first raw signal by four to obtain a first output signal LO1 having a frequency fLO1.

On the other hand (outside of the multi-channel receivers 2a and 2b), the multiplier 10 outputs, to the phase shifter 11, a signal obtained by multiplying a second raw signal of the PLL 9 by four. The phase shifter 11 is configured so that the phase value can be controlled by the phase controller 16b of the control unit 16, and outputs, to the power amplifier 12, a signal whose phase is shifted by a set phase value. The power amplifier 12 amplifies the phase shifted signal and outputs it as a second output signal LO2 having a second frequency fLO2 to the transmission phased array unit 21 for signal output of transmission channels Tx1 to Txm.

Further, the multiplier 13 multiplies a third raw signal of the PLL 9 by four, and outputs the third signal to the phase shifter 14. The phase shifter 14 is configured so that the phase value can be controlled by the phase controller 16b of the control unit 16, and outputs a signal whose phase has been shifted by the set phase value to the power amplifier 15. The power amplifier 15 amplifies the input signal and outputs it as a third output signal LO3 having a frequency fLO3 to the reception phase shifter IC 32a, 32b of the reception phased array unit 31. Further, the PLL 9 outputs a fourth output signal CLK1 as a self-diagnosis clock signal CLK1 to the reception phase shifter IC 32a, 32b of the reception phased array unit 31.

As a result, the general-purpose multi-channel IC 2 can synchronously generate the first output signal LO1 of the frequency fLO1, the second output signal LO2 of the frequency fLO2, and the third output signal LO3 of the frequency fLO3. Further, the general-purpose multi-channel IC 2 can generate the self-diagnosis clock signal CLK1 having a frequency fBIST_CLK in synchronization with the above-mentioned first to third output signals LO1 to LO3.

Since the PLL 9 in the same block generates all of the first to fourth signals, the first output signal LO1 to the third output signal LO3 and the self-diagnosis clock signal CLK1 respectively have a high correlation in terms of (i) the frequency change of the reference clock CLK and (ii) the frequency characteristic change caused by the change of the external environment (such as temperature). As a result, a high-quality signal with good C/N (or CNR Carrier to Noise ratio, or SNR Signal to Noise Ratio) and frequency accuracy can be generated.

The frequencies fLO1 to fLO3 of the first output signal LO1 to the third output signal LO3 are the same frequency as each other, i.e., 80 GHz, for example. The self-diagnosis clock signal CLK1 is a clock signal having a frequency fBIST_CLK (for example, about 20 MHz) that satisfies a frequency condition lower than the frequency of the first output signal LO1 to the third output signal LO3 and exceeding DC. When the radar system normally measures a distance to a target using the module 1, the control unit 16 stops the output of the self-diagnosis clock signal CLK1 by the PLL 9 to measure the distance.

On the other hand, the transmission phase shifter IC 22 includes two or more transmission channels Tx1 to Txm as transmission channels 24, and inputs of the transmission channels 24 are commonly connected to the same terminal. The transmission antenna 23 is connected to transmission end of each of the transmission channels 24 of the transmission phase shifter IC 22. Each of the transmission channels 24 is configured as a series connection of the phase shifter 25, the variable gain amplifier 26, and a power amplifier 27.

The phase shifter 25 of each of the transmission channels Tx1 to Txm is configured to be capable of adjusting the phase of the second output signal LO2 of the general-purpose multi-channel IC 2 based on the control signal input from the phase controller 16b of the control unit 16, for correlation among the transmission channels Tx1 to Txm. The phase controller 16b of the control unit 16 outputs a phase control signal respectively to the phase shifters 25 of each of the transmission channels Tx1 to Txm in step of several degrees. Then, the phase shifter 25 of each of the transmission channels Tx1 to Txm outputs a signal shifted by the phase multiplied respectively by a proportional number based on the identification numbers 1 to m of each of the transmission channels Tx1 to Txm.

When the beam steering is directed in a θ direction, a phase step φn of the phase shifter 25 is calculated according to the following equation (1). Here, λ=76.5 GHz wavelength and d=antenna spacing. For example, when the control unit 16 steers by using the phase controller 16b in a direction indicating 1°, each of the phase shifters 25 shifts phase by using the equation (1) and the identification numbers 1 to n of the transmission channels Tx1 to Txn, and the signal is output, such as 0° for channel 1, 3° for channel 2, and 6° for channel 3.

[Equation 1]

$$\varphi_n = (n-1) \times \frac{360° \times d \times \sin\theta}{\lambda} \quad (1)$$

The output of the phase shifter 25 is input to the variable gain amplifier 26. The variable gain amplifier 26 is configured to set an amplification amount adjusted based on the control signal input from the control unit 16, and amplifies the output of the phase shifter 25 to output the amplified signal to the power amplifier 27. The power amplifier 27 amplifies the output of the variable gain amplifier 26, and outputs the amplified signal to the transmission antenna 23 to irradiate a target (target: not shown) with radar waves in the millimeter wave band (for example, 80 GHz band).

On the other hand, the reception phased array unit 31 includes two reception phase shifter ICs 32a and 32b. Here, the configuration using the two reception phase shifter ICs 32a and 32b is described, but the number of the reception phase shifter ICs 32a and 32b is not limited to two. Since the reception phase shifter ICs 32a and 32b each have the same configuration, the configuration of the reception phase shifter IC 32a is described, and the configuration description of the reception phase shifter IC 32b is omitted.

The reception phase shifter IC 32a includes, or has as a built-in component, a reception channel 33 as a plurality of reception channels Rx1 to Rxn. A reception antenna 34 is connected to a reception end of the reception channel 33 of each of the reception channels Rx1 to Rxn. Further, a self-diagnosis signal generator 35 is included in the reception phase shifter IC 32a.

The reception phase shifter IC 32a receives the radar wave reflected by the target by the reception antenna 34, processes it via a low noise amplifier 36, a variable gain amplifier 37, the phase shifter 38, and a variable gain amplifier 39, and, after processing, synthesizes/composes, from each of the input signals, signals in the millimeter-wave band of the reception channel, and outputs the composite signal from an output terminal 40.

The (first) reception phase shifter IC 32a has the phase shifter 38 in the reception path. Note that the reception phase shifter IC 32a in the present embodiment includes, as shown in FIGS. 1 and 2, a power detector 60 for detecting the output power of the output terminal 40 at a proximity of the output terminal 40, for detecting the output power.

The low noise amplifier 36 performs a low noise amplification of the signal received from the reception antenna 34 after reflection by the target, and outputs the signal to the variable gain amplifier 37. The variable gain amplifier 37 is configured so that the amplification amount can be changed based on the control signal input from the amplification controller 16c of the control unit 16, and outputs the amplified signal to the phase shifter 38.

The phase shifter 38 of each of the reception channels Rx1 to Rxn adjusts the phase of the output of the variable gain amplifier 37 among the reception channels Rx1 to Rxn based on the phase control signal input from the phase controller 16b of the control unit 16, for correlation among the reception channels Rx1 to Rxn. For example, the control unit 16 outputs a phase control signal to the phase shifter 38 of each of the reception channels Rx1 to Rxn in step of several degrees by the phase controller 16b, so that the phase shifter 38 of each of the reception channels Rx1 to Rxn can generate signals, and output the signals by shifting the phase by an amount corresponding to the identification numbers 1 to n of each of the reception channels Rx1 to Rxn based on the equation (1).

For example, when the phase controller 16b of the control unit 16 outputs a phase control signal indicating 1° (one degree), the phase shifters 38 output, to the variable gain amplifier 39, signals with the phase shifted by the amount calculated based on the equation (1), the shifts of the phase corresponding to the identification numbers 1 to n of the reception channels Rx1 to Rxn, such as 0° for channel 1, 3° for channel 2, and 6° for channel 3, and the like.

The variable gain amplifier 39 is configured so that the amplification amount can be changed based on the control signal input from the amplification controller 16c of the control unit 16, and amplifies the output of the phase shifter 38. The reception phase shifter IC 32a synthesizes the output signals of the variable gain amplifiers 39 of the reception channels Rx1 to Rxn and outputs a millimeter wave band signal from the output terminal 40.

Note that a transmission line 61 is provided between the output terminal 40 and the variable gain amplifier 39 of each of the reception channels 33, which provides, for each of the reception channels, an equal length path according to a tournament mode. The tournament mode mentioned here is, for example, a mode in which a plurality of linear transmission lines are provided respectively as an equal length path between the output terminal 40 and the variable gain amplifier 39 of each of the reception channels Rx1 to Rxn of the reception channel 33 while being connected at a connection point, curved, and/or bent.

Therefore, the transmission line 61 transmits signals from the variable gain amplifier 39 of each of the reception channels Rx1 to Rxn to the output terminal 40 respectively along a path having the same length as each other, and transmits each signal with the phase of the transmitted signal matched to each other as much as possible among the reception channels Rx1 to Rxn. The structure of the transmission line 61 illustrated in FIG. 1 is just an example, and, as long as satisfying the condition that the path from the output ends of the reception channels Rx1 to Rxn to the output terminal 40 is an equal length path on the transmission line 61, the structure is not particularly limited to the above-described structure. The output signal of reception phase shifter 32a, 32b is input to each of the multi-channel receiver 2a, 2b of the general-purpose multi-channel IC 2.

Each of the multi-channel receivers 2a and 2b includes an LNA (Low Noise Amplifier) 3, a multiplier 4, a mixer 5, an IF filter 6, and a IF variable gain amplifier 7. The LNA 3 amplifies the output signal of the reception phased array unit 31, and outputs it to the mixer 5.

The multiplier 4 multiplies the first signal output by the PLL 9 by four, and outputs the first output signal LO1 having a frequency fLO1 to the mixer 5. The mixer 5 mixes the output of the LNA 3 and the output of the multiplier 4, and outputs the mixture to the IF filter 6. The IF filter 6 band-limits the band to a predetermined intermediate frequency band, and outputs a band-limited signal to the IF variable gain amplifier 7.

The IF variable gain amplifier 7 is configured so that the amplification degree can be adjusted based on the control signal input from the amplification controller 16c of the control unit 16, and amplifies the output of the IF filter 6 and outputs it to an A/D converter 8. The A/D converter 8 converts, from analog to digital, the output of the IF filter 6, and outputs it to the signal processor 17 as the intermediate frequency signal IFOUT (a first IFOUT for the first multi-channel receiver 2a, a second IFOUT for the second multi-channel receiver 2b). The signal processor 17 includes an FFT 17a, and processes the intermediate frequency signal IFOUT. The signal processor 17 measures the distance from the own device to the target, the relative velocity with the target, and the existence angle of the target by performing a predetermined signal processing.

In the following, the principle of measuring the existence angle of the target is described. When the module 1 irradiates the target with radar from the transmission phased array unit 21, the module 1 receives a radar wave reflected by the target from the reception antenna 34 of the reception phased array unit 31.

The control unit 16 controls a phase (p of the phase shifters 38 of the reception phase shifter ICs 32a and 32b by the phase controller 16b, for controlling directivity of reception pulse beams of the reception channels Rx1 to Rxn of the reception phase shifter ICs 32a and 32b. As a result, each phase in the reception phase shifter ICs 32a and 32b is shifted (i.e., controlled) to the target direction according to the equation (1) described above. Then, the signal processor 17 obtains the intermediate frequency signal IFOUT via the reception phase shifter ICs 32a and 32b and via the general-purpose multi-channel IC 2, respectively.

When the signal processor 17 calculates the existence angle of the target seen from the own device, the FFT 17a is used to perform high-speed (i.e., Fast) Fourier transformation on the output digital data of the intermediate frequency signal IFOUT, and the digital signal processing is performed for such data, to calculate a sum signal level Σ and a difference signal level A of the intermediate frequency signals IFOUT of the multi-channel receivers 2a, 2b (the first IFOUT and the second IFOUT respectively). The signal processor 17 is capable of measuring a reception angle of the radar reflected from the target by the monopulse method, by utilizing a character that an angle difference 6 between the reception direction of the reception pulse beam and the existence direction of the target is a function proportional to a ratio of the sum signal level Σ and the difference signal level A, as shown in the following equation (2).

[Equation 2]

$$\theta = f\left(\frac{\Delta}{\Sigma}\right) \quad (2)$$

The configuration of the self-diagnosis signal generator 35 for performing a self-diagnosis of the phase shifter 28 (also known as a Built-In Self-Test circuit or BIST circuit) of the reception channel 33 is described hereafter. When the radar system perform a self-diagnosis of the phase shifter 28 of the reception channel 33, the general-purpose multi-channel IC 2 outputs the third output signal LO3 generated thereby to the self-diagnosis signal generator 35 while outputting a self-diagnosis clock signal CLK1 having a frequency fBIST_CLK that satisfies a condition of being lower than the frequency of the third output signal LO3 to the self-diagnosis signal generator 35.

As shown in FIG. 2, the self-diagnosis signal generation unit 35 includes an IQ signal generator 50, an IQ orthogonal mixer 51, an adder circuit 55, and a mixer 56 as IQ signal generation units. The BIST circuit 35 is configured to operate effectively when self-diagnosing the phase shifter 38 of the transmission channel 33.

The IQ signal generator 50 is configured by using a frequency divider that is programmable to divide by 2 or more, and generates, as a clock IQ, a self-diagnosis I signal CLK_I and a self-diagnosis Q signal CLK_Q respectively based on division of a self-diagnosis clock signal CLK1, and outputs the signal to the IQ orthogonal mixer 51. The self-diagnosis I signal CLK_I and the self-diagnosis Q signal CLK_Q are clock signals having a frequency obtained by dividing the frequency fBIST_CLK of the self-diagnosis clock signal CLK1 by multiplying a factor 1/n and are IQ signals orthogonal to each other. Here, n represents an integer of 2 or more.

The IQ orthogonal mixer 51 is provided for up-converting a signal based on the third output signal LO3 and the self-diagnosis clock signal CLK1, and has a λ/4 line 52 and a first frequency converter 53, and a second frequency converter 54.

The λ/4 line 52 is used as a 90° phase shifter, and the input signal LO_Q of the third output signal LO3 of the general-purpose multi-channel IC 2 is phase-shifted by 90° and is output to the second frequency converter 54. The first frequency converter 53 receives an input of the third output signal LO3 as an input signal LO_Q, mixes the input signal LO_Q and the self-diagnosis I signal CLK_I, and outputs the mixture to the adder circuit 55.

The second frequency converter 54 mixes the output signal LO_I of the λ/4 line 52 and the self-diagnosis Q signal CLK_Q, and outputs the mixture to the adder circuit 55. The adder circuit 55 synthesizes the outputs of the first frequency converter 53 and the second frequency converter 54, and outputs the composite (synthesized) signal to a variable gain amplifier 56. The variable gain amplifier 56 is configured to adjust degree of amplification based on the control signal of the amplification controller 16c of the control unit 16, and inputs the amplified self-diagnosis signal to a PAD coupler 33a of a reception end of the reception antenna 24 of each of the reception channels 33. The variable gain amplifier 56 may be provided as required. The term "PAD" refers to a pad geometry shaped area.

The PAD coupler 33a is configured in each of the reception phase shifter IC 32a, 32b, and is configured at a reception end of each of the reception channel 33 to input a self-diagnosis signal thereto. The PAD coupler 33a is configured by capacitively coupling to the reception end of the reception channel 33, and couples the reception signal of the reception channel 33 with the self-diagnosis signal.

As shown in FIG. 1, the transmission line 58 is provided between the output of the self-diagnosis signal generator 35 and each of the PAD couplers 33a.

The transmission line 58 is configured as an equal length path which connects the PAD couplers 33a of each of the reception channels Rx1 to Rxn to the signal output end of the self-diagnosis signal generator 35 in a tournament mode.

The tournament mode mentioned here is, for example, a mode in which a plurality of linear transmission lines are provided respectively as an equal length path between the signal output end of the self-diagnosis signal generator 35 and the PAD coupler 33a of each of the reception channels Rx1 to Rxn while being connected at a connection point, curved, and/or bent.

For example, when the reception channels Rx1 and Rx2 are adjacent to each other, the PAD couplers 33a are coupled and bent at the midpoint thereof. Therefore, the connection point is positioned at an equal length from the location of the respective PAD couplers 33a.

The structure of the tournament mode illustrated in FIG. 1 shows an example, and, as long as satisfying a condition that the separate, equal length paths extend from the signal output end of the self-diagnosis signal generator 35 to the PAD coupler 33a of each of the reception channels Rx1 to Rxn, the structure is not limited to the above.

The transmission line 58 can transmit signals from the signal output end of the self-diagnosis signal generator 35 to the PAD coupler 33a at each of the reception channels Rx1 to Rxn in a tournament mode of equal length, separate paths, thereby enabling phase matching among the reception channels Rx1 to Rxn.

Hereinafter, the principle of self-diagnosis processing of the reception channel 33 is described. When the radar system starts the self-diagnosis of the reception channel 33, the general-purpose multi-channel IC 2 outputs the first raw signal from the PLL 9 to the multi-channel receivers 2a, 2b (which is multiplied to generate the first output signal LO1), and also outputs the local third output signal LO3 for self-diagnosis of the frequency fLO3 having the same frequency fLO1 of the first output signal LO1 to the self-diagnosis signal generator 35. Further, the general-purpose multi-channel IC 2 outputs a self-diagnosis clock signal CLK1 having a frequency fBIST_CLK that satisfies a frequency condition lower than the frequency fLO3 of the third output signal LO3 to the reception phase shifter ICS 32a, 32b.

The adder circuit 55 of the self-diagnosis signal generator 35 may be, ideally, configured to output, based on the self-diagnosis clock signal CLK1, a desired wave one-tone signal that is away from the frequency fLO3 of the third output signal L3 by a predetermined offset frequency fBIST_CLK/2.

By such ideal configuration, the mixer 5 of the multi-channel receiver 2a in a later stage is enabled to mix the desired one-tone signal with the reception signal of the reception channel 33, and to output one-tone, intermediate frequency signal IFOUT as the self-diagnosis signal BIST_OUT, as shown on the right side of FIG. 3.

Then, even when the signal processor 17 performs phase evaluation of the phase shifter 38 by performing FFT processing on the self-diagnosis monitor signal BIST_OUT by the FFT 17a, deterioration of the phase evaluation due to the image signal can be prevented. When the PLL 9 changes the frequency fBIST_CLK of the self-diagnosis clock signal CLK1, frequency band characteristics of the IF filter 6 may also be diagnosable.

On the right side of FIG. 3, one-tone desired wave is shown as a frequency above the frequency fLO3 of the third output signal LO3, and the image wave is shown as a frequency below the frequency fLO3 of the third output signal LO3. The output of the first frequency converter 53 is represented by the following equation (3).

[Equation 3]

$$\sin(\omega_{LO\_UP}t)\cos(\omega_{BIST\_CLK}t) = \frac{1}{2}[\cos\{(\omega_{LO\_UP} + \omega_{BIST\_CLK})t\} + \sin\{(\omega_{LO\_UP} - \omega_{BIST\_CLK})t\}] \quad (3)$$

In the equation (3), an angular frequency ωLO_UP represents an angular frequency 2π×fLO3 converted corresponding to the frequency fLO3 of the third output signal LO3. Further, an angular frequency ωBIST_CLK represents an angular frequency π×fBIST_CLK (=2π×fBIST_CLK/2) converted from each of the frequency fBIST_CLK/2 of I output and Q output of the IQ orthogonal signal generator 51. Similarly, the output of the second frequency converter 54 is represented by the following equation (4).

[Equation 4]

$$\cos(\omega_{LO\_UP}t)\sin(\omega_{BIST\_CLK}t) = \frac{1}{2}[\cos\{(\omega_{LO\_UP} + \omega_{BIST\_CLK})t\} - \sin\{(\omega_{LO\_UP} - \omega_{BIST\_CLK})t\}] \quad (4)$$

The equation (4) shows a relative calculation equation in consideration of the phase difference from the equation (3). When the adder circuit 55 combines the output of the first frequency converter 53 and the output of the second frequency converter 54, the second term on the right side of the equation (3) and the second term on the right side of the equation (4) cancel with each other, and the output of the adder circuit 55 can be represented as the following equation (5).

[Equation 5]

$$\sin(\omega_{LO\_UP}t)\cos(\omega_{BIST\_CLK}t)+\cos(\omega_{LO\_UP}t)\sin(\omega_{BIST\_CLK}t)=\cos\{(\omega_{LO\_UP}+\omega_{BIST\_CLK})t\} \quad (5)$$

It can be seen that the adder circuit 55 outputs a one-tone signal having an angular frequency (ωLO_UP+ωBIST_CLK) in principle by combining the output of the first frequency converter 53 and the output of the second frequency converter 54.

Further, the inventor of the present application verifies the degree of suppression of the image wave by simulation for the configuration of FIG. 2. As shown in FIG. 3 showing the simulation result of the output of the adder circuit 55, it has been confirmed that the power PRF+ of the upper frequency fRF+(=fLO3_+fBIST_CLK/2) which is the desired wave can obtain a larger gain than the power PRF− of the lower frequency fRF−(=fLO3_−fBIST_CLK/2) which is the image wave. Further, it has been confirmed that the leakage power PLO3 of the third output signal LO3 can be reduced to a considerable extent compared to the desired wave, and it has been confirmed that the configuration is sufficiently practical. The tone of the frequency fLO3 of the third output signal LO3 in FIG. 3 is suppressed to −40 dBc or less at an UPMIX output end of the mixer 55.

In such manner, the signal processor 17 can accurately evaluate the phase value of the phase shifter 38 at the frequency of the self-diagnosis clock signal CLK1 based on the FFT process performed by the FFT 17a on the intermediate frequency signal IFOUT. Specifically, the phase characteristics of the phase shifter 38 are diagnosable at a relatively lower frequency fBIST_CLK/2 based on the frequency fBIST_CLK of the self-diagnosis clock signal CLK1, which, as a result, enables accurate calculation of the phase error of the phase shifter 38. Thus, the phase φ of the phase shifter 38 is accurately evaluable.

As described above, according to the present embodiment, based on the third output signal L3 and the self-diagnosis clock signal CLK1 output in sync with the first/second signals LO1/LO2 from the PLL 9, the self-diagnosis signal generator 35 generates the self-diagnosis signal BIST_OUT to input to the reception phase shifter ICs 32a, 32b. In such manner, by combining the signals output from the general-purpose multi-channel IC 2 to generate/provide a high-quality on-chip BIST signal source having good C/N and frequency accuracy, the reception phase shifter ICs 32a, 32b is accurately self-diagnosable. Note that there is no need to configure a self-diagnosis signal generator by using the IQ orthogonal mixer 51, as shown in the embodiment described below.

Further, since the adder circuit 55 is configured to add the outputs of the first frequency converter 53 and the second frequency converter 54 to output a signal to the reception channel 33, the image interference of the intermediate frequency signal IFOUT, i.e., the self-diagnosis monitor signal BIST_OUT, that is mixed and output by the mixer 56 can be suppressed.

Second Embodiment

Figure 4:
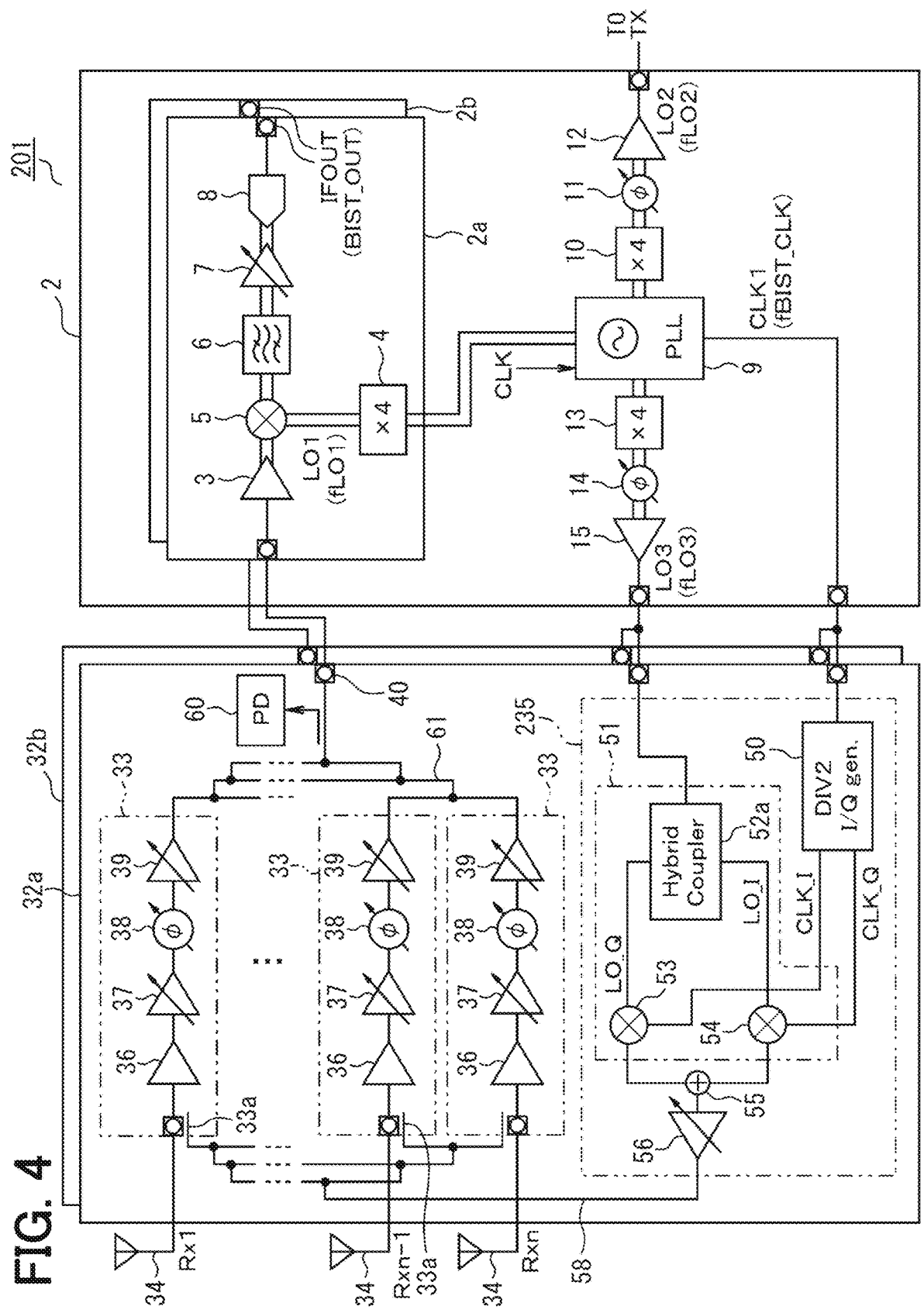
FIG. 4 is an electrical configuration diagram of the self-diagnosis signal generation unit according to a second embodiment.

FIG. 4 shows an illustration diagram of the second embodiment. The reception phase shifter IC 32a of a module 201 in FIG. 4 has a self-diagnosis signal generator 235 provided therein. The self-diagnosis signal generator 235 replaces the self-diagnosis signal generator 35 of the first embodiment, with other portions of the present embodiment staying unchanged (i.e., same numerals for same configuration for the brevity of description). The self-diagnosis signal generator 235 may have, instead of having the λ/4 line 52, a hybrid coupler 52a as a 90° phase shifter. The hybrid coupler 52a outputs the third output signal LO3 as local IQ signals having 90 degree phase difference from each other to the first and second frequency converters 53, 54, respectively.

Figure 5:
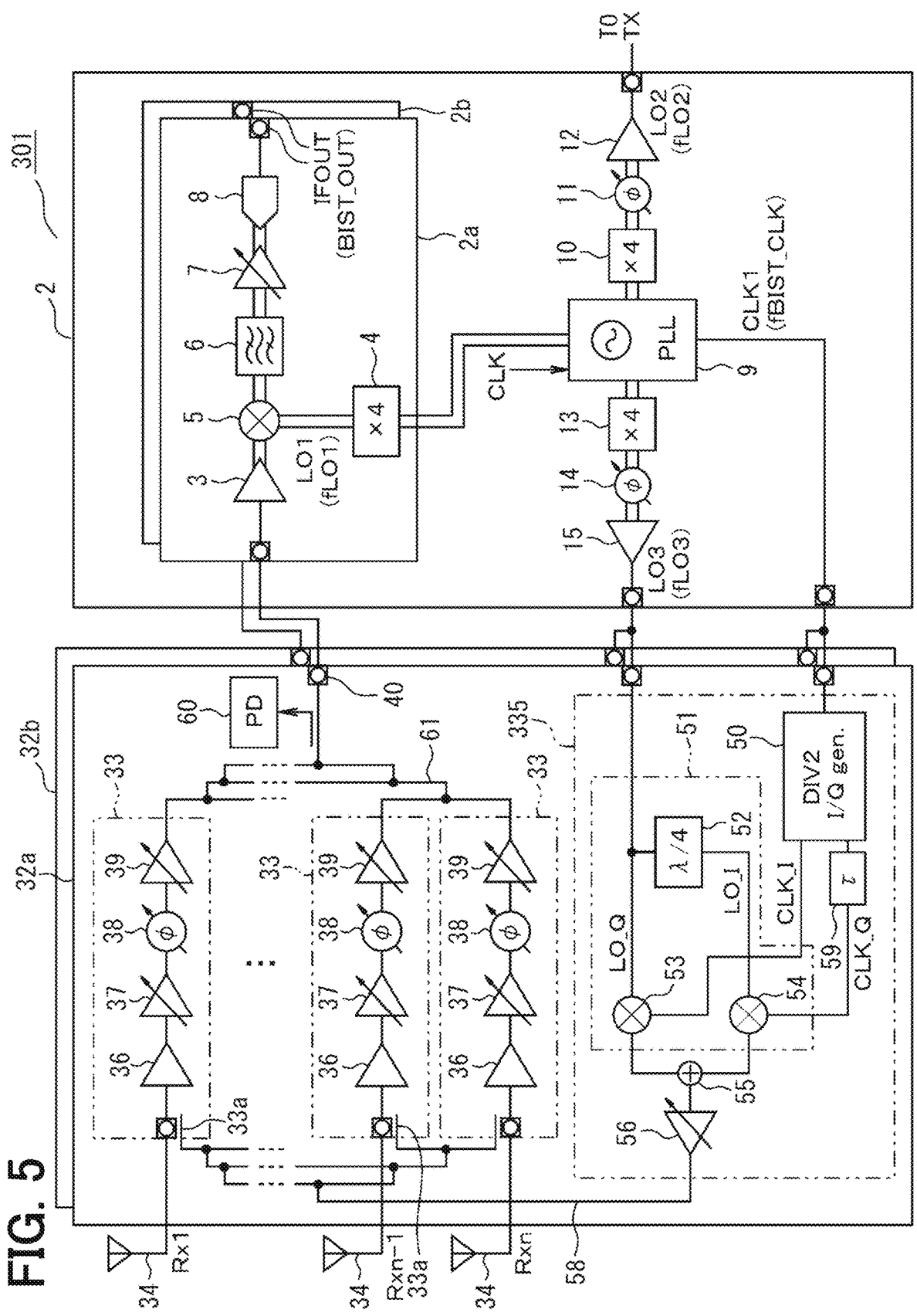
FIG. 5 is an electrical configuration diagram of the self-diagnosis signal generation unit according to a third embodiment.

Therefore, the first and second frequency converters 53, 54 respectively output signals having 90 degree phase difference. In the present embodiment, with the same operational effects as the first embodiment, one-tone signal is outputtable to the PAD coupler 33a of the reception channel 33, in principle. Thus, the same operational effects as the first embodiment Third Embodiment FIG. 5 shows an explanatory diagram according to the third embodiment. The reception phase shifter IC 32a of a module 301 shown in FIG. 5 includes a self-diagnosis signal generator 335. Though not illustrated, the reception phase shifter IC 32b also has the self-diagnosis signal generator 335 having similar configuration. The self-diagnosis signal generator 335 replaces the self-diagnosis signal generator 35 of the first embodiment, and other part of the configuration stay unchanged therefrom, i.e., having the same numerals for the same configuration for the brevity of description.

The self-diagnosis signal generator 335 includes a delayer 59. The delayer 59 is configured at an output of one or both of the self-diagnosis Q signal CLK_Q and the self-diagnosis I signal CLK_I of the IQ signal generator 50, for delaying the output of the self-diagnosis Q signal CLK_Q and the self-diagnosis I signal CLK_I and for improving the IQ balance. The delayer 59 corrects the phase difference of the clock IQ signal. The delayer 59 is provided to compensate for a phase error or the like based on individual variations or the like of each of the components 50 to 56 configured in the self-diagnosis signal generation unit 335. In such manner, it is possible to compensate for errors based on individual variations of the components. While the signal processor 17 monitors the image signal of the output of the intermediate frequency signal IFOUT by the FFT 17a, the control unit 16 changes the delay amount of the delayer 59, so that the image suppression effect can be increased.

Fourth Embodiment

Figure 6:
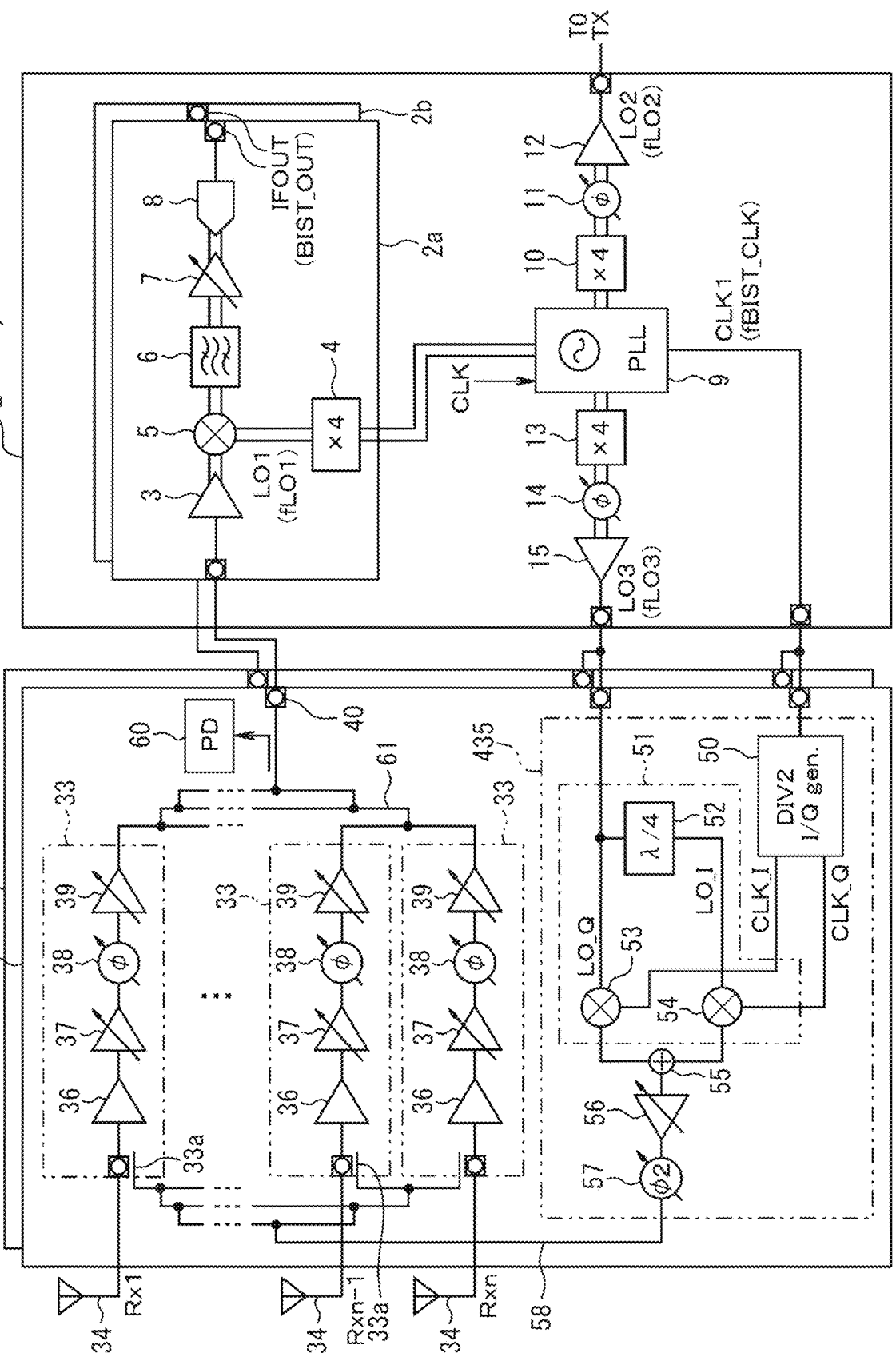
FIG. 6 is an electrical configuration diagram of the self-diagnosis signal generation unit according to a fourth embodiment.

FIG. 6 shows an explanatory diagram of the fourth embodiment. The reception phase shifter IC32a of a module 401 shown in FIG. 6 includes a self-diagnosis signal generator 435.

Although not shown, the reception phase shifter IC32b also has a similar self-diagnosis signal generation unit 435.

The self-diagnosis signal generation unit 435 has a configuration that replaces the self-diagnosis signal generation unit 35 described in the first embodiment, and has the same configuration as that of the first embodiment.

The self-diagnosis signal generator 435 includes the IQ signal generator 50, an IQ orthogonal mixer 51, the adder circuit 55, the variable gain amplifier 56, and the second phase shifter 57. The IQ orthogonal mixer 51 includes the λ/4 line 52, the first frequency converter 53, and the second frequency converter 54.

The second phase shifter 57 is configured to adjust a phase φ2 based on the control signal of the control unit 16, and inputs the output of the variable gain amplifier 56 after adjustment by the phase φ2 to the PAD coupler 33a of each of the reception channels 33. The second phase shifter 57 is provided to appropriately adjust the output phase of the adder circuit 55.

The image suppression effect can be enhanced by the control unit 16 adjusting the phase φ2 of the second phase shifter 57 while the signal processor 17 monitors the image signal of the output of the intermediate frequency signal IFOUT.

Fifth Embodiment

Figure 7:
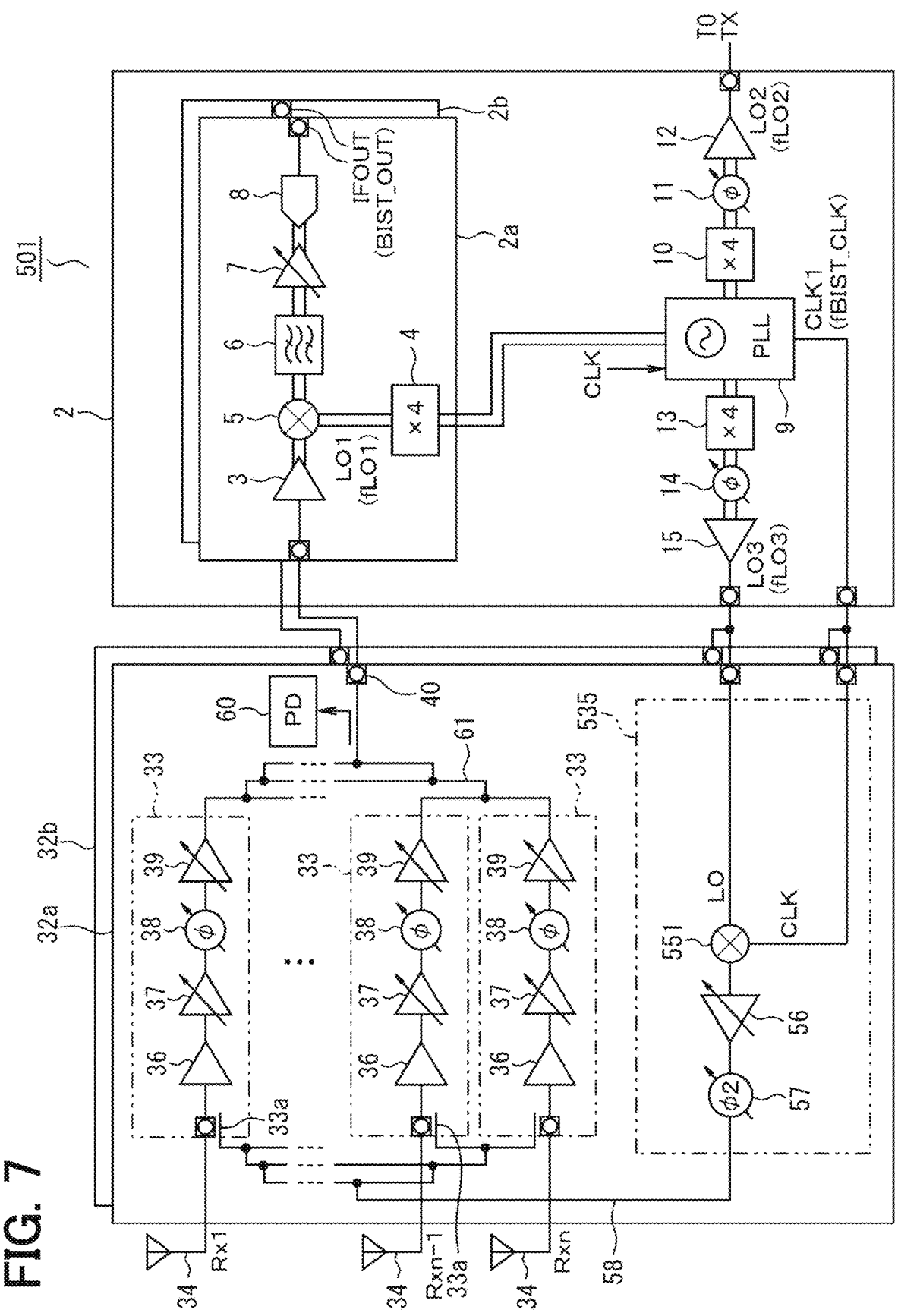
FIG. 7 is an electrical configuration diagram of the self-diagnosis signal generation unit according to a fifth embodiment.

FIG. 7 shows an explanatory diagram of the fifth embodiment. The reception phase shifter IC32a of a module 501 illustrated in FIG. 7 includes a self-diagnosis signal generator 535. Although not shown, the reception phase shifter IC 32b also has a similar self-diagnosis signal generator 535. The self-diagnosis signal generator 535 has a configuration that replaces the self-diagnosis signal generator 35 described in the first embodiment, and other part of the present embodiment has the same configuration as that of the first embodiment.

The self-diagnosis signal generator 535 may include a single up-conversion mixer 551 instead of the IQ orthogonal mixer 51. In the present embodiment, as illustrated in FIG. 7, the self-diagnosis signal generator 535 is composed of an up-conversion mixer 551, the variable gain amplifier 56, and the second phase shifter 57. Since the IQ orthogonal mixer 51 is not used in the configuration illustrated in FIG. 7, the self-diagnosis signal generator 535 outputs a two-tone RF signal in which the third output signal LO3 and the self-diagnosis clock signal CLK1 are mixed. The two-tone RF signals have almost the same amplitude at frequencies fLO3±fBIST_CLK. In such situation, while the signal processor 17 monitors the intermediate frequency signal IFOUT, the control unit 16 adjusts and controls the phase φ2 of the second phase shifter 57 by the phase controller 16b. The inventor has learned that two peaks can be obtained while controlling image interference for a phase change of 0° to 360° of the second phase shifter 57. Therefore, the control unit 16 can enhance the image suppression effect by adjusting and controlling the phase φ2 of the second phase shifter 57.

Sixth Embodiment

FIGS. 8 to 11 show explanatory views of the sixth embodiment. The reception phase shifter IC 32a of a module 601 illustrated in FIG. 8 includes a self-diagnosis signal generator 635. Although not shown, the reception phase shifter IC 32b also has a similar self-diagnosis signal generator 635. The self-diagnosis signal generator 635 has a configuration that replaces the self-diagnosis signal generator 35 described in the first embodiment, and other part of the present embodiment has the same configuration as that of the first embodiment.

The self-diagnosis signal generator 635 may be configured to include an up-conversion mixer 651 capable of switching between a two-tone mode and a through mode instead of including the IQ orthogonal mixer 51. In the present embodiment, a mode in which the radar system realizes a noise canceller function of the transmission signal by using the up-conversion mixer 651 in the through mode of the module 601 is described.

The up-conversion mixer 651 in the present embodiment has the same functions as the IQ orthogonal mixer 51 described in the first embodiment, which enables the operation of the up-conversion mixer 651 in the two-tone mode that up-converts the base signal and outputs two tones from the first frequency mixer 653 based on the third output signal LO3 and the self-diagnosis clock signal CLK1. Further, the up-conversion mixer 651 can operate in the through mode in which the operation of the second frequency mixer 654 is invalidated and the up-conversion mixer 653 behaves as a cascade amplifier without mixing so that the third output signal LO3 is output "through" from the first frequency mixer 653.

Figure 9:
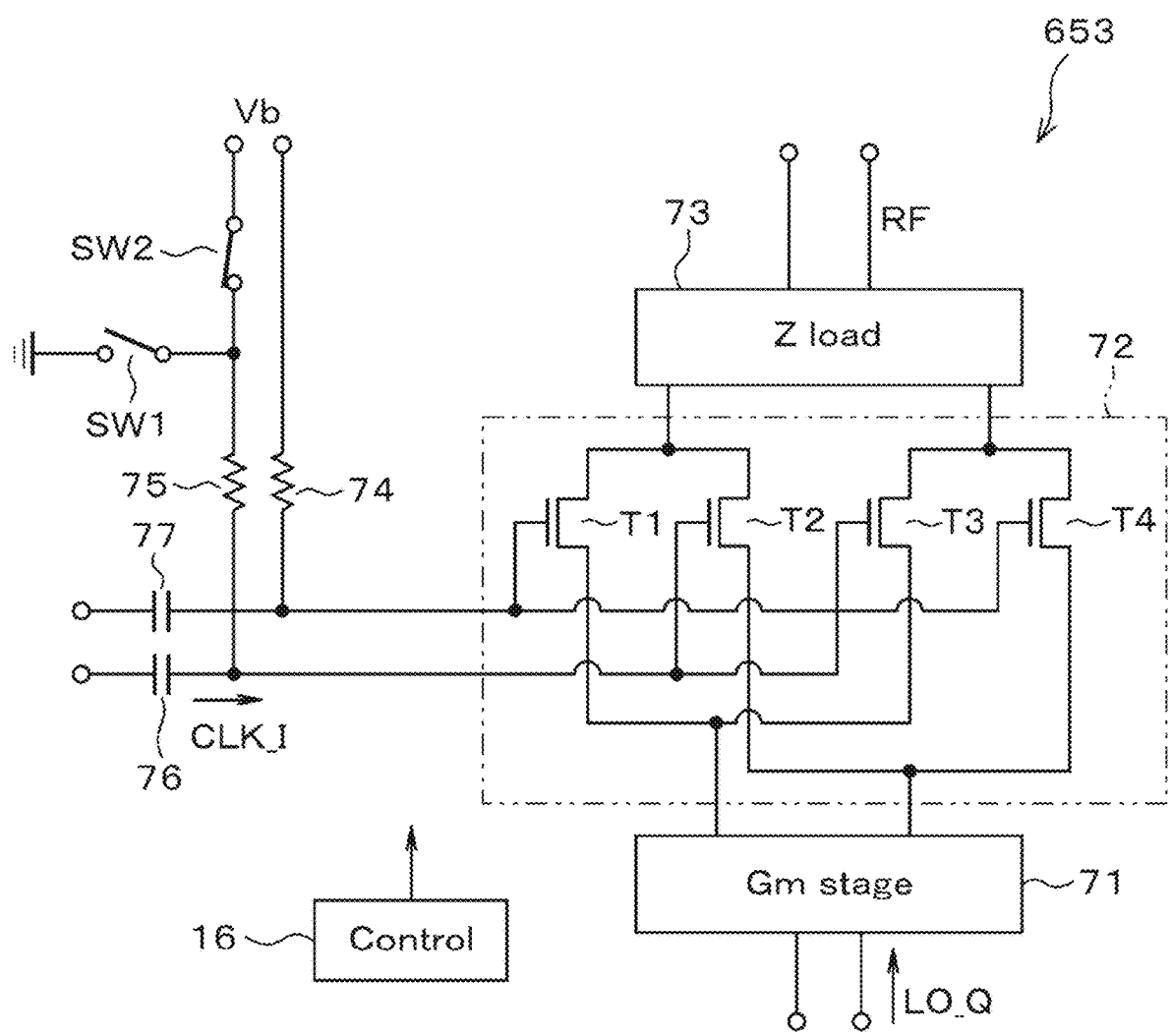
FIG. 9 is an electrical configuration diagram of a first frequency mixer according to the sixth embodiment.
Figure 10:
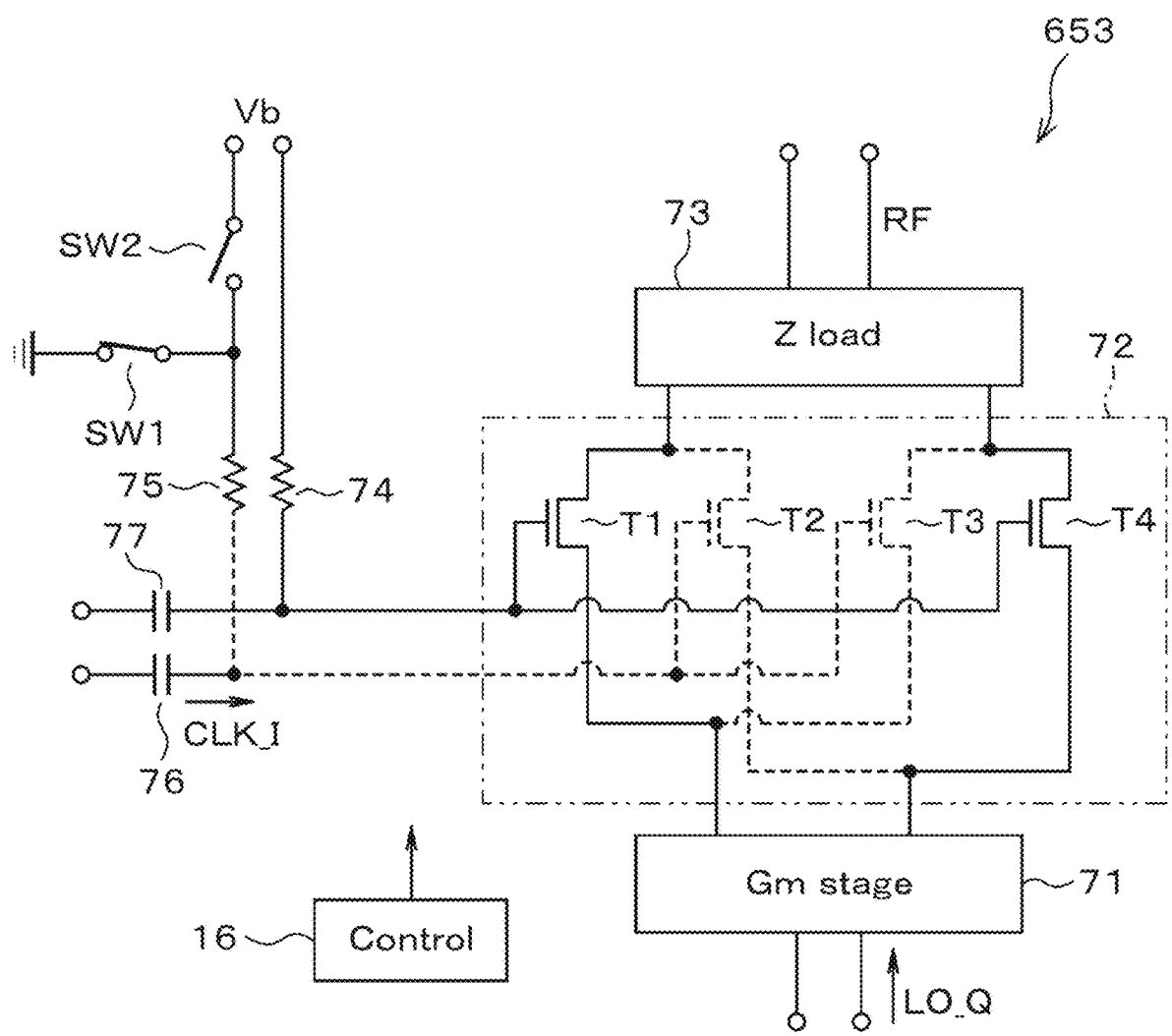
FIG. 10 is an explanatory diagram of effects of the first frequency mixer in the sixth embodiment.

FIGS. 9 and 10 show an electrical configuration diagram of the first frequency mixer 653. As shown in FIG. 9, the first frequency mixer 653 includes (i) an amplification stage 71 (also known as a Gm stage) that amplifies the third output signal LO3 at a predetermined amplification degree and (ii) a switch stage 72 including first to fourth transistors T1 to T4, respectively at their gate serving as an input terminal, receiving input of a self-diagnosis I signal CLK_I for a self-diagnosis of the clock IQ signal that is generated by dividing a self-diagnosis clock signal CLK1, and also includes a Gilbert mixer that outputs a high frequency to a load 73. The first transistor T1 to the fourth transistor T4 are each composed of, for example, a MOS transistor.

The gates of the first and fourth transistors T1 and T4 are connected to each other. The gates of the second and third transistors T2 and T3 are connected to each other. Further, the sources as energizing terminals on the amplification stage 71 side of the first and third transistors T1 and T3 are connected to each other. Further, the sources as energizing terminals on an amplification stage 71 side of the second and fourth transistors T2 and T4 are connected to each other. Further, the drains as energizing terminals on a load 73 side of the first and second transistors T1 and T2 are connected to each other. Further, the drains as energizing terminals on a load 73 side of the third and fourth transistors T3 and T4 are connected to each other.

Further, in the present embodiment, a DC bias Vb is configured to be applied to the gates of the first and fourth transistors T1 and T4 and the gates of the second and third transistors T2 and T3, respectively, through resistors 74 and 75, respectively. Note that switches SW1 and SW2 are connected to a supply point of the DC bias Vb with respect to the gates of the second and third transistors T2 and T3, so that the DC bias Vb can be switchably input thereto according to ON and OFF of the switches SW1 and SW2 under control of the control unit 16.

The self-diagnosis I signal CLK_I is input to the gates of the second and third transistors T2 and T3 through a DC cutoff capacitor 76. Further, the self-diagnosis I signal CLK_I is input to the gates of the first and fourth transistors T1 and T4 through a DC cutoff capacitor 77. Further, the third output signal LO 3 is input to the sources of the first to fourth transistors T1 to T4 as a Q signal LO_Q via the amplification stage 71. Therefore, the first to fourth transistors T1 to T4 can output a signal obtained by mixing the third output signal LO3 and the self-diagnosis I signal CLK_I of the IQ signal generator 50 to the adder circuit 55 through the load 73.

When the control unit 16 outputs the same self-diagnosis signal as the self-diagnosis signal generator 35 from the self-diagnosis signal generator 635, the control unit 16 performs ON control of the switch SW2 of the first frequency mixer 653, and OFF control of the switch SW1, as shown in FIG. 9. Further, the control unit 16 controls the switch SW2 of the second frequency mixer 654 to be turned ON and the switch SW1 (of the second frequency mixer 654) to be turned OFF. As a result, the control unit 16 operates the first frequency mixer 653. Although not shown, the control unit 16 also operates the second frequency mixer 654 at the same time.

The up-conversion mixer 651 outputs an up-converted signal from the first frequency mixer 653 based on the third output signal LO3 and the self-diagnosis clock signal CLK1, and also outputs, from the second frequency mixer 654, an up-converted signal output based on the third output signal LO3 and the self-diagnosis clock signal CLK1. At such time, both the first frequency mixer 653 and the second frequency mixer 654 of the up-conversion mixer 651 are respectively operating in the two-tone mode. The adder circuit 55 can output a one-tone signal to the PAD coupler 33a by adding the output signals of the first frequency mixer 653 and the second frequency mixer 654. In such case, as described by exemplifying the self-diagnosis signal generator 35 in the first embodiment, the same self-diagnosis signal as the self-diagnosis signal generator 35 can be generated and output to the PAD coupler 33a.

Figure 8:
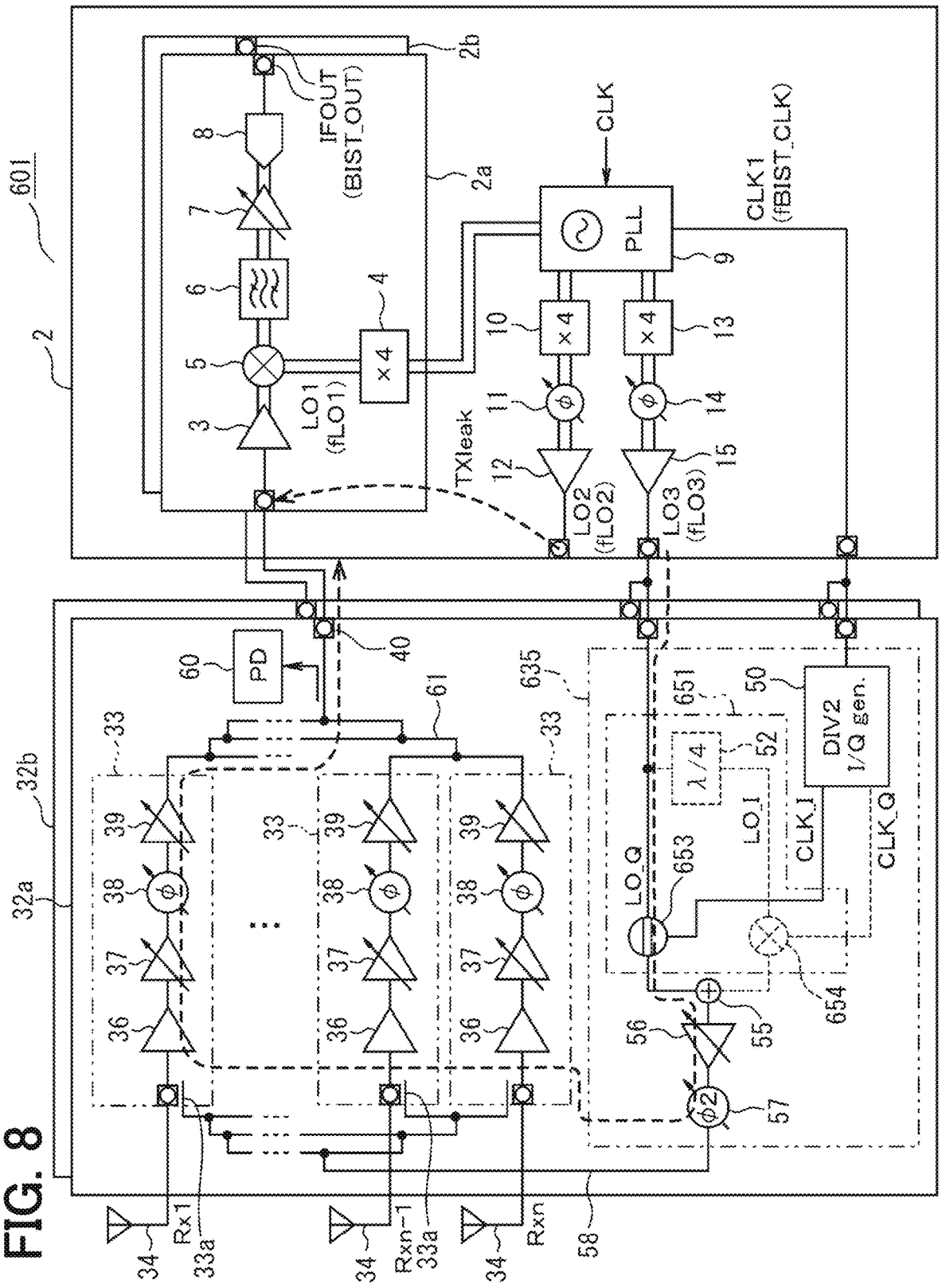
FIG. 8 is an explanatory diagram of a function of a noise canceller according to a sixth embodiment.

Further, in the general-purpose multi-channel IC 2, it is assumed that the second output signal LO2 generated for the transmission channel 24 sneaks into the signal input end of the multi-channel receiver 2a through the inside of the IC (see TXleak in FIG. 8). In order to cancel such noise, it is desirable to operate the up-conversion mixer 651 in the through mode when operating as a normal radar system.

When the control unit 16 operates the up-conversion mixer 651 in the through mode, as shown in FIG. 10, the switch SW1 of the first frequency mixer 653 is turned ON and the switch SW2 is turned OFF. Further, the control unit 16 invalidates the operation of the second frequency mixer 654 by turning OFF the bias current supplied to a Gm stage (in FIG. 9).

As a result, the DC bias Vb is applied to the gates of the transistors T1 and T4 of the first frequency mixer 653, and the gates of the transistors T2 and T3 become the ground potential through the resistor 75. Since the transistors T2 and T3 are always OFF, the functions of the transistors T2 and T3 can be completely disabled. As a result, the input of the self-diagnosis I signal CLK_I can be invalidated.

The DC bias Vb is applied to the gates of the transistors T1 and T4. Therefore, the transistors T1 and T4 can function effectively. Since the first frequency mixer 653 at such time has the same circuit as the cascode amplifier, the third output signal L3 (i.e., Q signal LO_Q) input to the sources of the transistors T1 and T4 is amplified and is output to the load 73. In an actual operation, it is desirable to stop the self-diagnosis clock signal CLK1 itself output from the PLL 9 by a ground short-circuit switch in order to improve signal quality.

In the present embodiment, when the radar system performs normal ranging (i.e., distance measurement) processing using the module 1, the control unit 16 switches the up-conversion mixer 651 to the through mode to realize a noise canceller function for the transmission signal leakage. The general-purpose multi-channel IC 2 outputs the third output signal LO3 to the self-diagnosis signal generator 635 in synchronization with the second output signal LO2 output to the transmission phased array unit 21. Therefore, the frequency of the radar output by the transmission phased array unit 21 is synchronized with the frequency fLO3 of the third output signal LO3.

By setting the up-conversion mixer 651 to the through mode, the control unit 16 can input the one-tone signal of the third output signal LO3 "as is" to the PAD coupler 33a through the adder circuit 55.

Figure 11:
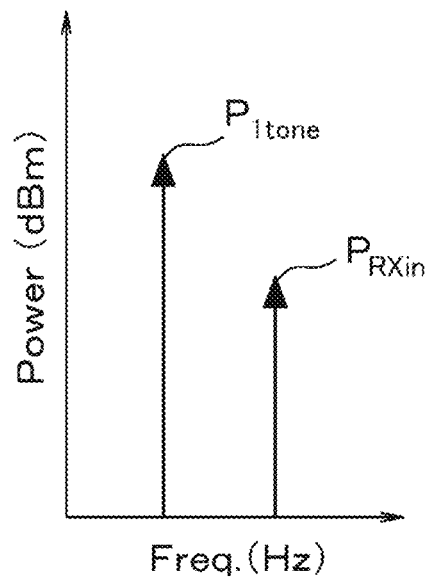
FIG. 11 is an explanatory diagram of a signal leak according to the sixth embodiment.
Figure 12:
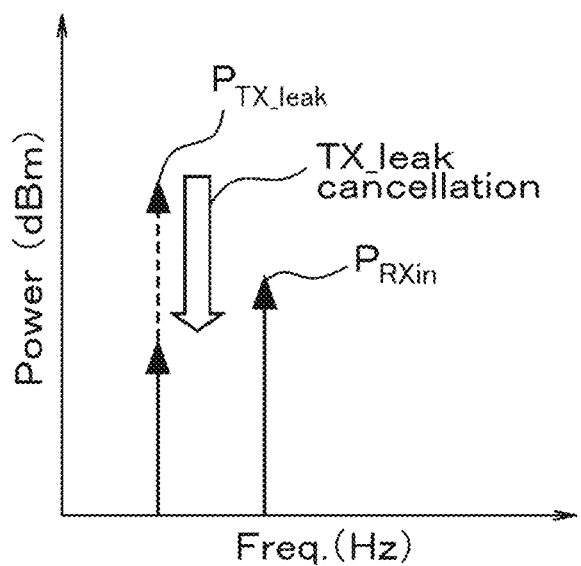
FIG. 12 is an explanatory diagram of effects of noise cancelling according to the sixth embodiment.

As illustrated in FIG. 11, it is important that the BIST1tone power P1tone of the third output signal LO3 output by the self-diagnosis signal generator 635 is adjusted to the same power as the TX leak, in order to obtain sufficient leak cancellation. The control unit 16 adjusts the phase of the BIST 1tone power P1tone to the opposite phase with respect to a transmission leakage signal by adjusting the phase φ2 of the second phase shifter 57. As a result, the leakage of the transmission signal can be canceled as illustrated in FIG. 12. On the other hand, a desired wave PRXIN reflected by the target and received is not affected by noise cancellation because the RX reception signal frequency, which is reflected from the object, is far away from the TX leakage frequency (LO frequency).

Therefore, even if the transmission signal of the general-purpose multi-channel IC2 leaks to the reception input end of the general-purpose multi-channel IC2, such transmission leakage can be canceled during the normal operation of the module 601.

Seventh Embodiment

Figure 13:
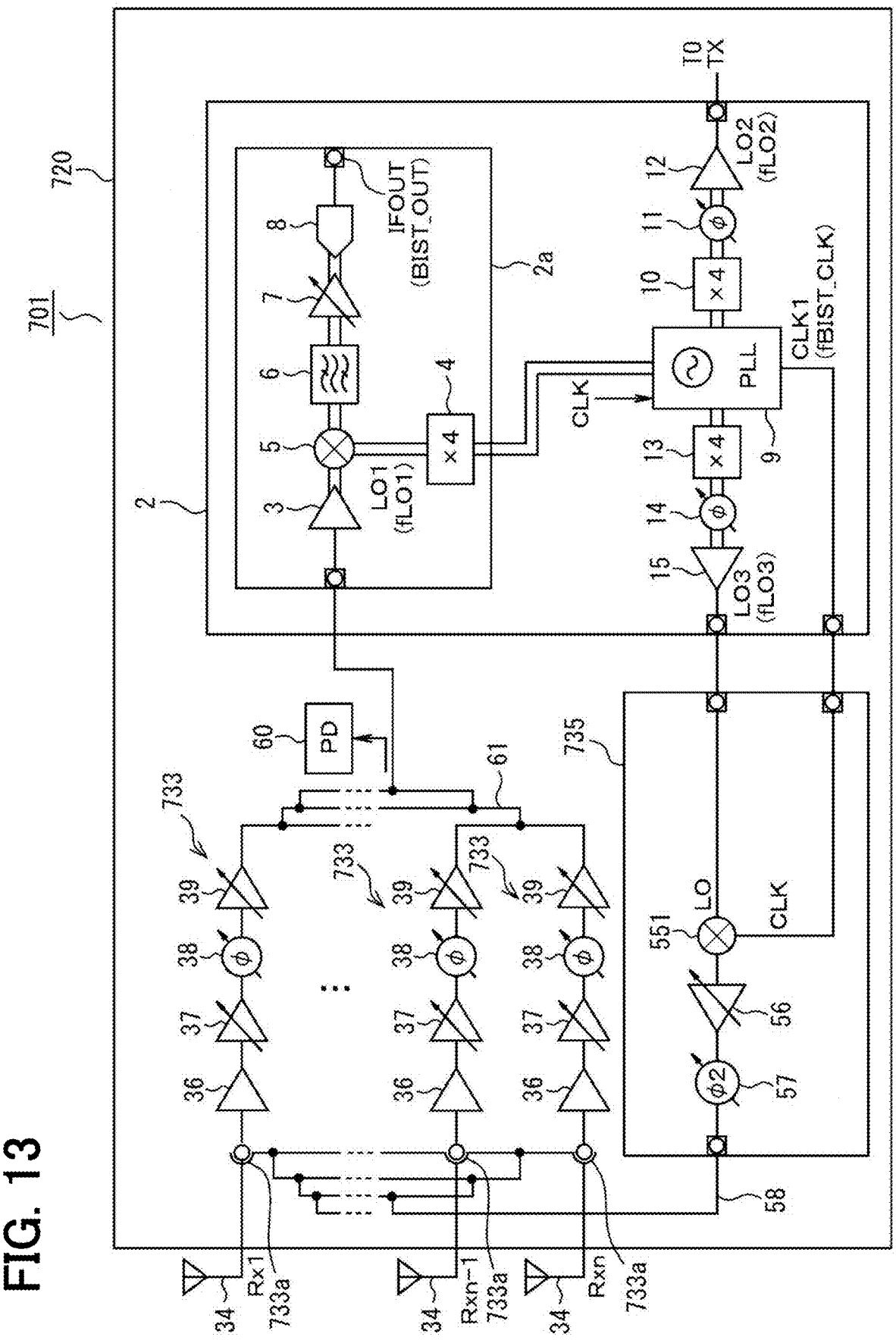
FIG. 13 is a an electrical configuration diagram of a radar system according to a seventh embodiment.
Figure 14:
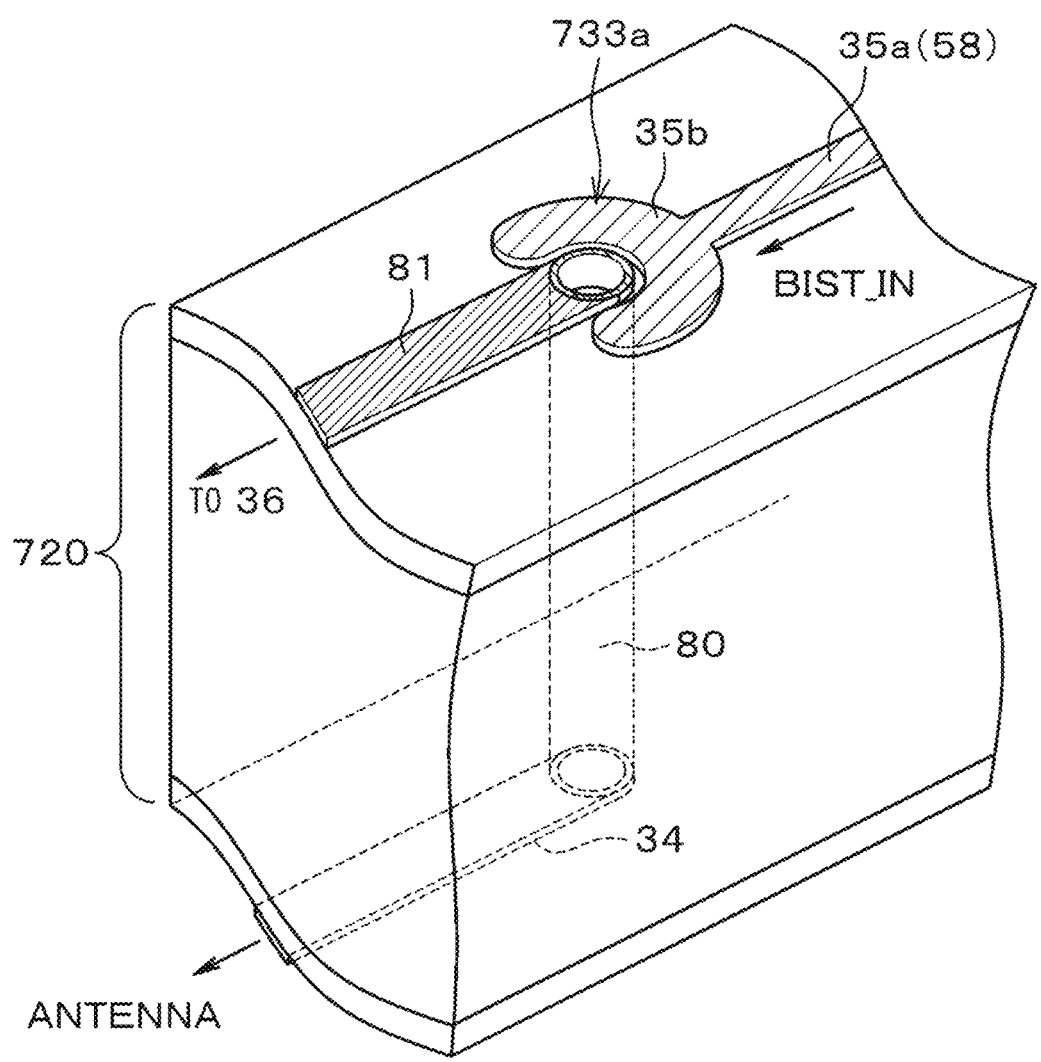
FIG. 14 is a perspective view schematically showing a structure of a PCB wiring coupler according to the seventh embodiment.

FIGS. 13 and 14 show explanatory views of the seventh embodiment. As illustrated in FIG. 13, a module 701 may be configured by using discrete components without integrating a part or all of the configuration of the reception phase shifter IC 32a described in the above embodiments. As illustrated in FIG. 13, the module 701 is configured by mounting a general-purpose multi-channel IC 2 and a diagnostic signal generation IC 735 in which a self-diagnosis signal generator 535 is integrated on the surface layer of a PCB (Printed Circuit Board) 720. Although the transmission phased array unit 21 is not shown in FIG. 13, it may be mounted on the PCB 720 or may be mounted on another PCB.

The PCB 720 has a copper foil surface formed on the surface layer and the back layer, and a dielectric layer is sandwiched between the copper foil surfaces. The circuit of the reception channel 33 is mounted on the surface layer, and the reception antenna 34 is formed flat on the back layer (See FIG. 14). In a reception channel 733 of the present embodiment, the low noise amplifier 36, the variable gain amplifier 37, the phase shifter 38, and the variable gain amplifier 39 are respectively composed of discrete components on the surface layer of the PCB 720.

When the reception channel 733 is composed of discrete components on the surface layer of the PCB 720, it may be preferable to provide a PCB wiring coupler 733a at the reception end of the reception channel 733 of each of the reception channels Rx1 to Rxn as illustrated in FIG. 14.

A through-hole via 80 and a reception wiring 81 are provided as a transmission line between the reception antenna 34 and the LNA 36. The through-hole via 80 is configured to penetrate the surface layer and the back layer of the PCB 720 and make a conductive connection therebetween. One end of the reception wiring 81 is connected to a surface land of the through-hole via 80, and the other end is connected to the input end of the LNA 36. A BIST wiring 35a constitutes the transmission line 58 described in the above-described embodiment, and includes a coupling portion 35b that surrounds a part of the surface land of the through-hole via 80 and is configured to be separate from the surface land.

The PCB wiring coupler 733a is configured by capacitively coupling the reception wiring 81 and the coupling portion 35b. Therefore, the diagnostic signal generation IC 735 outputs the diagnostic signal to the PCB wiring coupler 733a through the BIST wiring 35a, so that the coupling input can be made to the reception end of the reception channel 733.

A reception phase shifter IC 721 is not limited to the single reception phase shifter ICs 32a and 32b, but also includes a part or all of the reception phase shifter ICs 32a and 32b composed of discrete parts.

Other Embodiments

The present disclosure is not limited to the embodiments described above, but can be implemented by various modifications, and can be applied to various embodiments without departing from the spirit of the present disclosure. For example, the following modifications or extensions are possible.

The configurations and functions of the plural embodiments described above may be combined. A part of the above-described embodiment may be dropped as long as the problem identified in the background is resolvable. In addition, various modifications of the present disclosure may be considered as encompassed in the present disclosure, as long as such modifications pertain to the gist of the present disclosure.

Although the present disclosure is described based on the above embodiments, the present disclosure is not limited to the disclosure of the embodiment and the structure. The present disclosure is intended to cover various modification examples and equivalents thereof. In addition, various modes/combinations, one or more elements added/subtracted thereto/therefrom, may also be considered as the present disclosure and understood as the technical thought thereof.

What is claimed is:

1. A self-diagnosis device of a phased-array antenna module for a millimeter wave radar, the self-diagnosis device comprising:
    a reception phase shifter integrated circuit (IC) including
        a reception channel that has a phase shifter disposed on a reception path for a phase shift of a plurality of reception signals of each of a plurality of reception channels;
    a general-purpose multi-channel IC that:
        includes multi-input channels and multi-output channels,
        incudes a singular Phase-Locked Loop (PLL) that generates and enables synchronous output of a first output signal, a second output signal, a third output signal, and a fourth output signal,
        receives output signals, of the plurality of reception signals input from the reception phase shifter IC and, through the multi-input channels, respectively, mixes the output signals from the reception phase shifter IC with the first output signal to obtain intermediate frequency signals, and outputs the intermediate frequency signals through the multi-output channels, respectively;

a transmission phase shifter IC that outputs signals of a plurality of transmission channels by using the second output signal; and a self-diagnosis signal generation unit generating a self-diagnosis signal that is input to the reception channel of the reception phase shifter IC based on the third output signal and the fourth output signal synchronously output with the first output signal and the second output signal.

2. The self-diagnosis device according to claim 1, wherein the self-diagnosis signal generation unit includes an IQ orthogonal mixer for up-converting a signal corresponding to the third output signal and the fourth output signal.

3. The self-diagnosis apparatus according to claim 2, wherein the self-diagnosis signal generation unit includes a 90° phase shifter that changes the phase of the third output signal by 90° with respect to each other.

4. The self-diagnosis device according to claim 2, wherein the self-diagnosis signal generation unit includes an IQ signal generator that generates a clock IQ signal based on programmable division of the fourth output signal by two or more, and the self-diagnosis signal generation unit generates the self-diagnosis signal by up-converting the third output signal and the clock IQ signal of the IQ signal generator by using the IQ orthogonal mixer.

5. The self-diagnosis device according to claim 4, wherein the self-diagnosis signal generation unit includes a delayer for improving IQ balance at the output of one or both of the clock IQ signals.

6. The self-diagnosis device according to claim 1 further comprising:

a second phase shifter, wherein the self-diagnosis signal generation unit adjusts the phase by using the second phase shifter to generate the self-diagnosis signal.

7. The self-diagnosis apparatus according to claim 1 further comprising:

an up-conversion mixer (A) having a first frequency mixer and a second frequency mixer, and (B) switching between a two-tone mode and a through mode, the two-tone mode outputting signals from the first frequency mixer by up-converting a signal that is based on the third output signal and the self-diagnosis clock signal, the through mode outputting the third output signal from the first frequency mixer, and the switching between the two-tone mode and the through mode enabled by turning ON and OFF of switches.

8. The self-diagnosis apparatus according to claim 7, wherein the up-conversion mixer realizes, when set in the through mode, a noise canceller function for cancelling a leak of the transmission signal based on the second output signal generated by the general-purpose multi-channel IC.

9. The self-diagnosis device according to claim 1, wherein the self-diagnosis signal generation unit inputs the self-diagnosis signal through a PAD coupler formed in the reception phase shifter IC.

10. The self-diagnosis device according to claim 1, wherein the self-diagnosis signal generation unit inputs the self-diagnosis signal to the reception phase shifter IC through a Printed Circuit Board (PCB) wiring coupler formed in a PCB on which the reception channel is mounted.

11. The self-diagnosis apparatus according to claim 10, wherein the PCB wiring coupler includes a coupling portion configured to surround a through-hole via formed in the PCB.

12. A phased-array antenna module comprising:

a reception phased array circuit including:
 a first reception phase shifter circuit, and
 a second reception phase shifter, and
 a self-diagnosis signal generator located in the first reception phase shifter;

a multi-channel circuit including:
 a first multi-channel receiver,
 a second multi-channel receiver, and
 a phase-locked loop circuit; and a transmission phased array circuit including:
 a first transmission phase shifter circuit, and
 transmission antennas, wherein the reception phased array circuit is configured to output:
 (i) a first composite reception signal from the first reception phase shifter circuit to the first multi-channel receiver, and
 (ii) a second composite reception signal from the second reception phase shifter circuit to the second multi-channel receiver;

wherein the multi-channel circuit is configured to receive:
 (i) the first composite reception signal,
 (ii) the second composite reception signal, and
 (iii) a reference clock signal;

wherein the multi-channel circuit is configured to output:
 (i) a first intermediate frequency signal based at least partly upon:
  the first composite signal, and
  a first output signal,
 (ii) a second output signal based at least partly on the reference clock signal,
 (iii) a third output signal based at least partly on the reference clock signal and generated independently from the second output signal, and
 (iv) a self-diagnosis clock signal based on the reference clock signal, and having a lower frequency than the reference clock signal;

wherein the first transmission phase shifter circuit is configured to receive the second output signal; and wherein the first reception phase shifted circuit is configured to receive:
 (i) the self-diagnosis clock signal, and
 (ii) the third output signal.

13. The phased-array antenna module according to claim 12, wherein the first reception phase shifter circuit includes:
 (i) reception channels, wherein each reception channel includes a respective upstream end and a respective downstream end;
 (ii) a power detector;
 (iii) an output terminal; and
 (iv) a composite transmission line connecting the downstream end of each reception channel to the output terminal, wherein the self-diagnosis signal generator is configured to:
    receive the self-diagnosis clock signal,
    receive the third output signal, and
    generate a self-diagnosis signal, and
wherein the self-diagnosis signal is coupled to the upstream end of each reception channel.

14. The phased-array antenna module according to claim 13, wherein the self-diagnosis signal generator includes:
(i) an IQ signal generator configured to:
    receive the self-diagnosis clock signal, and
    generate by frequency division a self-diagnosis I-signal and a self-diagnosis Q-signal;
(ii) an IQ orthogonal mixer configured to:
    receive the third output signal,
    receive the self-diagnosis I-signal,
    receive the self-diagnosis Q-signal,
    output a first frequency converted signal, and
    output a second frequency converted signal;
(iii) an adder circuit configured to:
    receive the first frequency converted signal,
    receive the second frequency converted signal, and
    output a synthesized signal; and
(iv) a variable gain amplifier configured to:
    receive the synthesized signal,
    amplify the synthesized signal, and
    output the self-diagnosis signal.

15. The phased-array antenna module according to claim 14, wherein the IQ orthogonal mixer includes:
a first frequency converter configured to:
    receive the third output signal,
    receive the self-diagnosis I-signal, and
    output the first frequency converted signal;
a ninety degree phase shifter configured to:
    receive the third output signal, and
    output a shifted third output signal; and
a second frequency converter configured to:
    receive the shifted third output signal,
    receive the self-diagnosis Q-signal, and
    output the second frequency converted signal.

\* \* \* \* \*